US008690591B2

(12) United States Patent
Charnesky et al.

(10) Patent No.: US 8,690,591 B2
(45) Date of Patent: Apr. 8, 2014

(54) ELECTRIC VEHICLE WITH SECONDARY CHARGE CORD RELEASE MECHANISM

(75) Inventors: Scott P. Charnesky, Birmingham, MI (US); Paul W. Alexander, Ypsilanti, MI (US); Tony Argote, Jr., Rochester HIlls, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 13/156,981

(22) Filed: Jun. 9, 2011

(65) Prior Publication Data

US 2012/0313580 A1 Dec. 13, 2012

(51) Int. Cl.
*H01R 13/635* (2006.01)
*H01R 13/633* (2006.01)
*H01R 13/62* (2006.01)

(52) U.S. Cl.
USPC ........... 439/153; 320/109; 320/104; 439/152; 74/500.5; 191/12

(58) Field of Classification Search
USPC ................ 439/153, 258, 304; 191/8, 12.4; 320/104, 109
See application file for complete search history.

(56) References Cited

U.S. PATENT DOCUMENTS

| | | | |
|---|---|---|---|
| 3,938,405 A * | 2/1976 | Sommerer | 74/502.2 |
| 3,955,441 A * | 5/1976 | Johnson | 74/502.4 |
| 4,754,255 A | 6/1988 | Sanders et al. | |
| 4,757,304 A | 7/1988 | Rho | |
| 4,898,010 A | 2/1990 | Futami et al. | |
| 4,917,420 A * | 4/1990 | Rogers, Jr. | 292/198 |
| 5,077,831 A | 12/1991 | Weber | |
| 5,134,392 A | 7/1992 | Takeuchi et al. | |
| 5,431,460 A * | 7/1995 | Hass et al. | 292/216 |
| 5,442,341 A | 8/1995 | Lambropoulos | |
| 5,711,558 A * | 1/1998 | Woody | 292/335 |
| 5,751,135 A * | 5/1998 | Fukushima et al. | 320/107 |
| 5,955,981 A | 9/1999 | Rangan | |
| 6,092,845 A * | 7/2000 | Koenig | 292/225 |
| 6,094,131 A | 7/2000 | Chen et al. | |

(Continued)

FOREIGN PATENT DOCUMENTS

EP     604055 A2 *  6/1994  ............. E05B 65/19

OTHER PUBLICATIONS

Harper, P., Edison SmartConnect: The Path Forward. Daily Issue Alert 2008 [retrieved on Aug. 28, 2008]. Retrieved from Internet <URL:http://www.energyblogweb.com/issuealert/article.asp?id=2965&Print=True>.

(Continued)

*Primary Examiner* — Drew A Dunn
*Assistant Examiner* — Michael Dibenedetto
(74) *Attorney, Agent, or Firm* — Ingrassia Fisher & Lorenz, P.C.

(57) ABSTRACT

A secondary (backup) release (unlocking and unlatching) of a charge cord for plug-in electric vehicles or hybrid electric vehicles is provided. A charging port is configured to receive a charging cord and includes a lock bolt configured to lock the charging cord in the charging port during charging. The vehicle also includes a hood assembly having a hood latch with a first cable coupled to the hood latch. A second cable is coupled to the latch bolt and a sheath of the first cable for unlocking the lock bolt. A retainer is coupled to the hood assembly and is configured to limit movement of the second cable until the hood latch has released the hood assembly.

16 Claims, 9 Drawing Sheets

(56) References Cited

U.S. PATENT DOCUMENTS

| | | | |
|---|---|---|---|
| 6,105,459 A * | 8/2000 | Troiano | 74/542 |
| 6,542,071 B1 | 4/2003 | Ohtsubo et al. | |
| 6,557,910 B2 * | 5/2003 | Amano | 292/201 |
| 6,581,987 B1 * | 6/2003 | Gentile et al. | 292/216 |
| 6,617,975 B1 | 9/2003 | Burgess | |
| 7,015,791 B2 | 3/2006 | Huntzicker | |
| 7,444,192 B2 | 10/2008 | Dickinson et al. | |
| 7,677,631 B1 | 3/2010 | Zischke et al. | |
| 8,172,599 B2 * | 5/2012 | Konchan | 439/352 |
| 8,206,171 B2 * | 6/2012 | Osawa et al. | 439/352 |
| 2004/0183655 A1 | 9/2004 | Takata | |
| 2006/0170224 A1 * | 8/2006 | Mitchell et al. | 292/216 |
| 2008/0217927 A1 * | 9/2008 | Browne et al. | 292/28 |
| 2009/0091291 A1 | 4/2009 | Woody et al. | |
| 2009/0210357 A1 | 8/2009 | Pudar et al. | |
| 2009/0242291 A1 * | 10/2009 | Sagawa et al. | 180/65.265 |
| 2010/0237632 A1 * | 9/2010 | Browne et al. | 292/201 |
| 2010/0271192 A1 | 10/2010 | Mituta | |
| 2012/0071017 A1 * | 3/2012 | Gaul et al. | 439/304 |
| 2012/0083148 A1 * | 4/2012 | Hirashita et al. | 439/304 |
| 2012/0088382 A1 * | 4/2012 | Konchan | 439/153 |

OTHER PUBLICATIONS

Tendril Volt. Plug in to what's Plugged-In. 2008 [retrieved on Aug. 28, 2008]. Retrieved from Internet <URL:http://www.tendrilinc.com/consumers/products/volt/>.

ZigBee Alliance Smart Energy Certified Products. 2008 [retrieved on Aug. 28, 2008]. Retrieved from Internet <URL:http://www.zigbee.org/en/certification/certified_products_zse.asp>.

Southern California Edison. Advanced Metering Infrastructure. Southern California Edison 2006. [Retrieved on Aug. 28, 2008]. Retrieved from Internet <URL:http://www.sce.com/ami>.

Designing the Future: A Smart Grid Newsletter Case Study, Nov. 2006. [Retrieved on Aug. 28, 2008]. Retrieved from Internet <URL:http://www.smartgridnews.com>.

Southern California Edison. Testimony supporting application for approval of advanced metering infrastructure pre-deployment activities and cost recovery mechanism, Dec. 21, 2006. Obtained on Aug. 28, 2008, vol. 1.

Coulomb Technologies, Inc. "The ChargePoint Network as a Platform for Advanced Services," [Retrieved on Apr. 14, 2009]. Retrieved from Internet: <URL: http://chargepoint.fatcow.com/library/chargepoint_datasheet.php>.

Coulomb Technologies, Inc. "ChargePoint Network Operating System," [Retrieved on Apr. 14, 2009]. Retrieved from Internet: <URL: http://chargepoint.fatcow.com/library/NOS_datasheet.php>.

Coulomb Technologies, Inc. "Smartlet Networked Charging Stations," [Retrieved on Apr. 14, 2009]. Retrieved from Internet: <URL: http://chargepoint.fatcow.com/library/smartlet_datasheet.php>.

Coulomb Technologies, Inc. "Plug-In Vehicles: Taking Charge of an Enabling Infrastructure," Jul. 2008, pp. 1-4. [Retrieved on Apr. 14, 2009]. Retrieved from Internet: <URL: http://www.coulombtech.com/library/PPHEVCI-final.pdf>.

German Patent and Trade Mark Office, Office Action in German Patent Application No. 10 2012 208 661.7, mailed Jul. 12, 2013.

* cited by examiner

ELECTRIC VEHICLE WITH SECONDARY CHARGE CORD RELEASE MECHANISM

TECHNICAL FIELD

The technical field generally relates to systems and methodologies for charging electric vehicles or hybrid electric vehicles, and more particularly, to systems and methodologies for a secondary (backup) release (unlocking and unlatching) of a charge cord for plug-in electric vehicles or hybrid electric vehicles.

BACKGROUND

Plug-in electric and hybrid electric vehicles are becoming increasingly popular. These vehicles are known as plug-in vehicles because onboard energy storage systems (e.g., battery packs) are recharged from a power source, such as a utility power source, by connecting (plugging in) the vehicle to an outlet.

In a typical charging situation, an electric (or hybrid electric) vehicle is connected to a local power grid at a home location (for example) and the onboard energy storage system is charged from the local power grid. It may also be desirable (or necessary) to charge the vehicle at locations other than the driver's home (or other base location), such as by plugging the vehicle into a charging station at a parking facility or the driver's place of business. In these remote charging situations, it is often desirable to lock the charging cord (or cable) into the vehicle during charging, until such time as the vehicle is unplugged by the driver.

While unlikely, it is possible that a failure in one or more systems of the vehicle may render inoperative the main (or principle) unlocking mechanism of the charging cord, which would leave the vehicle tethered to the charging station until the failed system could be repaired. Also, it is possible that the unlatching mechanism of the charge cord may fail, which again prevents the user of the vehicle from releasing the charge cord and operating the vehicle.

Accordingly, it is desirable to provide systems and methods that provide a user with a secondary (or backup) charge cord release mechanism for plug-in vehicles. Additionally, other desirable features and characteristics will become apparent from the subsequent description taken in conjunction with the accompanying drawings and the foregoing technical field and background.

BRIEF SUMMARY

In accordance with an exemplary embodiment, a secondary (backup) release (unlocking and unlatching) of a charge cord for plug-in electric vehicles or hybrid electric vehicles is provided. The vehicle includes an electric engine coupled to a battery source and a charging port configured to receive a charging cord for charging the battery source. The charging port includes a lock bolt configured to lock the charging cord in the charging port during charging. The vehicle also includes a hood assembly having a hood latch with a first cable coupled to the hood latch. A second cable is coupled to the lock bolt and a sheath of the first cable for unlocking the lock bolt. A retainer is coupled to the hood assembly and is configured to limit movement of the second cable until the hood latch has released the hood assembly.

In accordance with another exemplary embodiment, a secondary (backup) release (unlocking and unlatching) of a charge cord for plug-in electric vehicles or hybrid electric vehicles is provided. The vehicle includes an electric engine coupled to a battery source and a charging port configured to receive a charging cord for charging the battery source. The charging port includes a lock bolt configured to lock the charging cord in the charging port during charging and a unlatch bolt to unlatch the charging cord when the lock bolt is moved to an unlock position. The vehicle also includes a hood assembly having a hood latch with a first cable coupled to the hood latch. A second cable is coupled to the lock bolt and a sheath of the first cable for unlocking the lock bolt. A retainer is coupled to the hood assembly and is configured to limit movement of the second cable until the hood latch has released the hood assembly.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-8 are merely illustrative and may not be drawn to scale.

Figure 1:
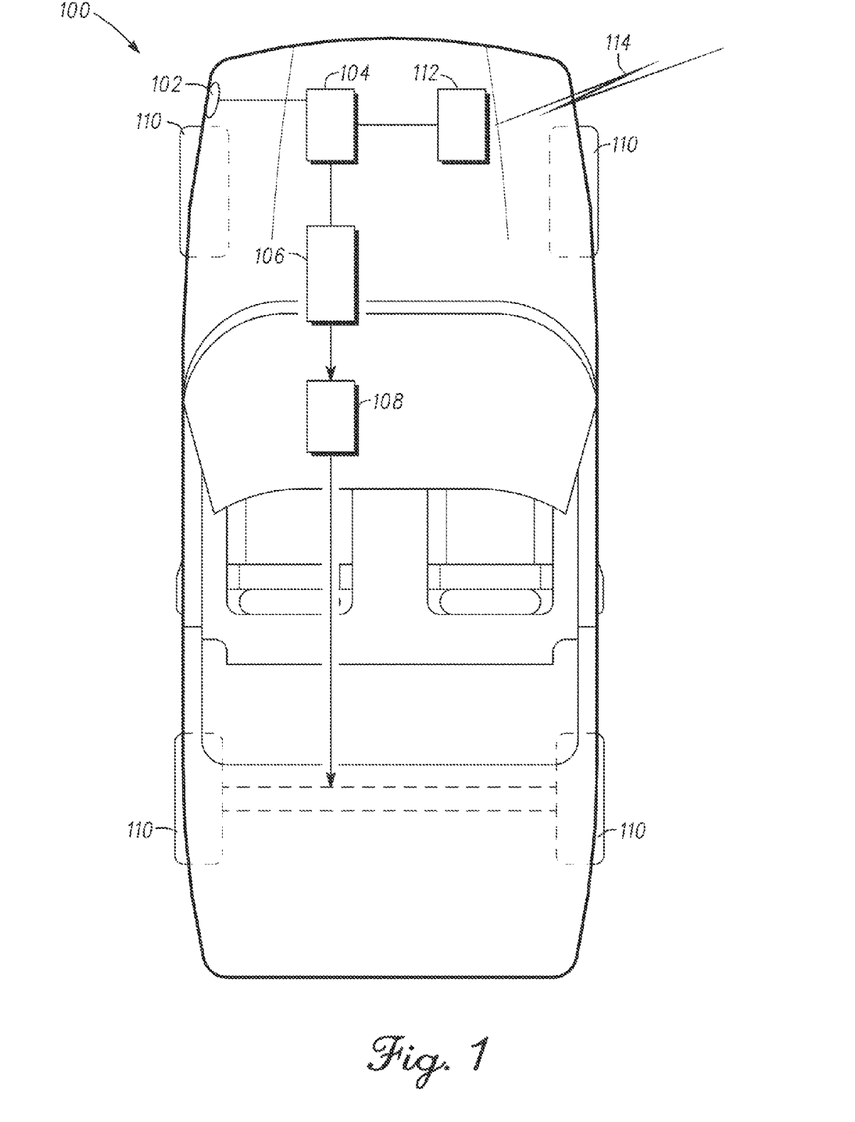
FIG. 1 is an illustration of a vehicle according to an exemplary embodiment.

FIG. 1 is a simplified schematic representation of an embodiment of a vehicle 100 according to the present disclosure. Although vehicle 100 is illustrated as a purely electric vehicle, the techniques and concepts described herein are also applicable to hybrid electric vehicles. The illustrated embodiment of plug-in vehicle 100 includes, without limitation: a plug-in charging port 102; a charging control module 104 coupled to an onboard energy storage system 106; an electric propulsion system 108 driving wheels 110; and an onboard data communication system 112.

The plug-in charging port 102 may be configured as any suitable charging interface, and in one embodiment, comprises a charging receptacle compatible with the J1772 standard, which receives a charging cable with compatible plug (not shown in FIG. 1). The charging control module 104, may include any type of processing element or vehicle controller, and may be equipped with nonvolatile memory, random access memory (RAM), discrete and analog input/output (I/O), a central processing unit, and/or communications interfaces for networking within a vehicular communications network. Onboard energy storage system 106 may be realized as a rechargeable battery pack having a single battery module or any number of individual battery modules. Onboard energy storage system 106 provides electrical energy that enables electric propulsion system 108 to provide traction power to wheels 110. The onboard data communication system 112 supports uni-directional or bi-directional communication 114 (e.g., with a user key fob) for unlocking the vehicle and/or charge cord. While unlikely, it is possible that the onboard data communication system 112 may fail (or a component such as the antenna becomes damaged), preventing the user from unlocking the charge cord via the key fob. Also, it is possible that some failure in the charging control module 104, which controls the charging port 102, prevents the charge cord unlocking or unlatching system to operate. Accordingly, as described in detail below, the various embodiments of the present disclosure address this remote possibility by providing a secondary (backup) charge cord release mechanism for the convenience of the vehicle user.

While FIG. 1 is a schematic diagram that depicts various electrical and mechanical connections and couplings in a very simplified manner for ease of description, an actual embodiment of vehicle 100 will of course utilize additional physical components and devices that are well known in the automotive industry. Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

Figure 2A:
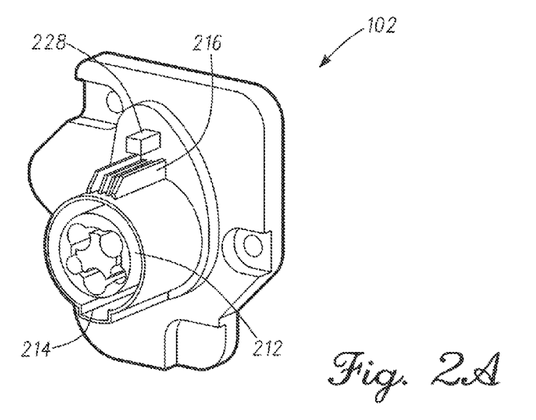
FIGS. 2A and 2B are illustrations of an exemplary charging port and charging cord suitable for use in the vehicle of FIG. 1.
Figure 2B:
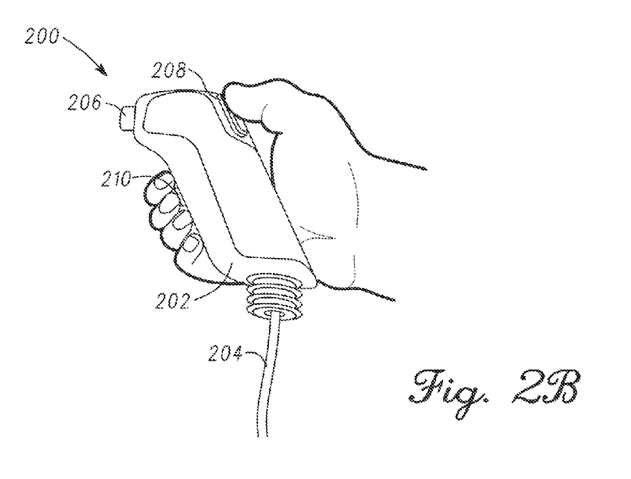

FIGS. 2A and 2B are illustrations of an exemplary plug-in charging port 102 and compatible charge cord (with plug) 200. As previously mentioned, in one embodiment, the plug-in charging port 102 and the charging cord 200 are compatible with the J1772 standard. The charging cord 200 includes an assembly 202 configured to any convenient shape (e.g., handle) for facilitating a user plugging in the charge cord 200. The assembly 202 electrically couples conductors 204 from a power grid (not shown) to a plug 206 that has a mating interface with the charging port 102. In some embodiments, charging cord 200 includes a charge cord release actuator which may be operated by a thumb actuator (e.g., switch or sensor) 208 or a finger actuator (e.g., trigger or lever) 210 for the convenience of the user. The plug 206 of the charging cord 200 interfaces with a receptacle 212 of the plug-in charging port 102, which may also include a locating or guide keyway 214 and a receptacle latch 216 for retaining the charging cord 200 in place during a charging session, and a charge cord lock 228 as will be further described below. While also unlikely, it is possible that the charge cord release actuator (208 or 210) may fail. In such circumstances, the user may be unable to release the charging cord 200 from the vehicle, and therefore, be prevented from operating the vehicle.

Figure 3:
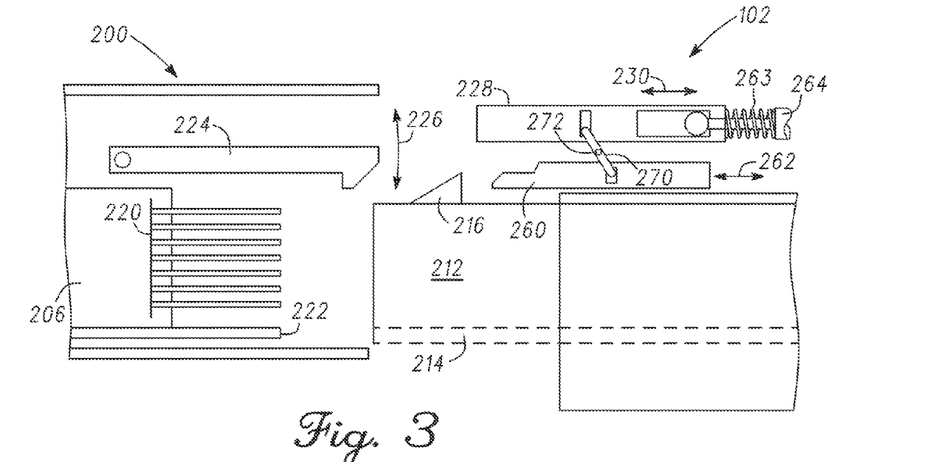
FIG. 3 is an illustration of the exemplary charging port and charging cord of FIGS. 2A and 2B in an unlatched/unlocked position according to an exemplary embodiment.

Referring to FIG. 3, an illustration of the plug-in charging port 102 and charging cord 200 in an unlatched/unlocked position is shown. As illustrated, the plug 206 is aligned with the receptacle 212 so that electrodes 220 can conduct a charging current from the power grid (not shown) to the charging control module (104 of FIG. 1) of the vehicle. A guide pin 222 is also aligned to mate with the recess or keyway 214, which aids in proper plug/receptacle connection. As previously mentioned, a cable latch 224 may be employed to prevent dislodgment or uncoupling of the plug/receptacle connection.

On the receptacle 102 side, a locking bolt 228 is biased 263 to move longitudinally (as indicated by arrow 230) to advance over the cable latch 224 when plugged in to prevent it from rising (226) over the receptacle latch 216. For unlocking and unlatching, the charging port 102 includes an unlatching bolt 260, so that the charging cord 200 can be unlatched by the vehicle independent of the charging cord release actuators (208 or 210 in FIG. 2B). Operationally, when the locking bolt 228 is withdrawn or retracted (230), an opposite motion (262) is made by the unlatching bolt 260 due to the connector 270 pivoting about its axis 272. This results in the lifting the cable latch 224 over the receptacle latch 216 (due in the illustrated embodiment to the beveled surfaces), so that automatic unlocking and unlatching occur in a single operation as discussed below.

Ordinarily, some actuation mechanism (e.g., solenoid) would retract the locking bolt 228 or advance the unlatch bolt 260 responsive to a user action such as activating a key fob. However, in the unlikely event of a system failure or damage to a component, the present disclosure provides a secondary (or backup) release system that uses cable 264 as will described in detail below.

Figure 4A:
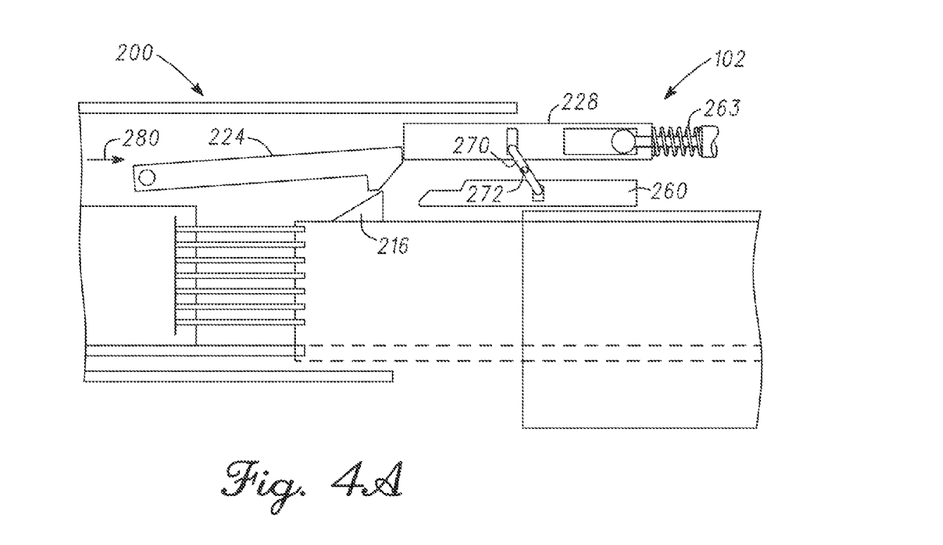
FIGS. 4A-4D are illustrations of the exemplary charging port and charging cable of FIGS. 2A and 2B moving into a latched and locked position according to an exemplary embodiment.
Figure 4B:
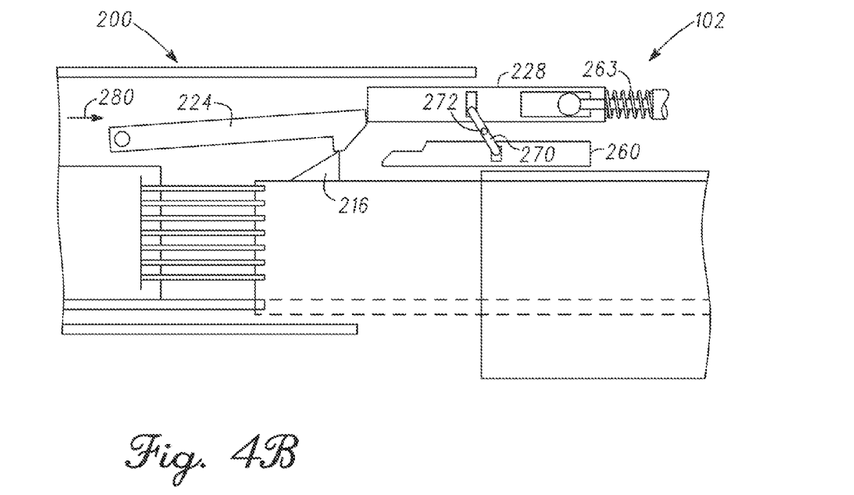
Figure 4C:
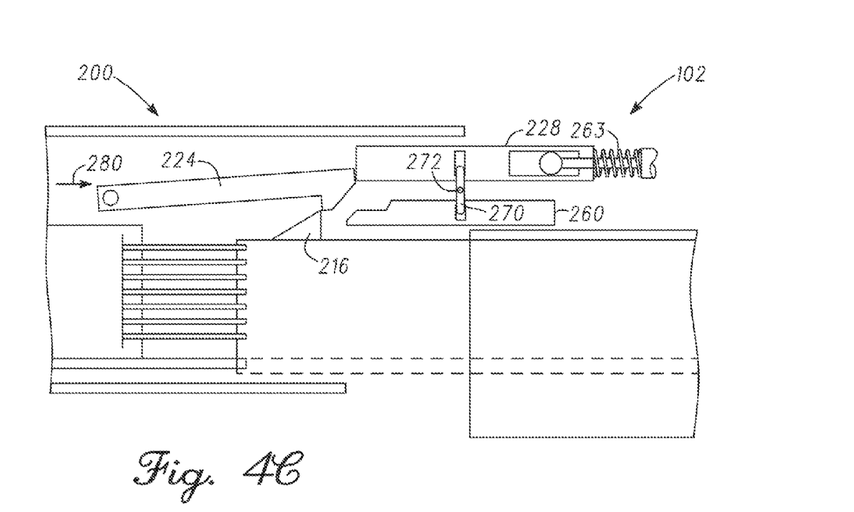
Figure 4D:
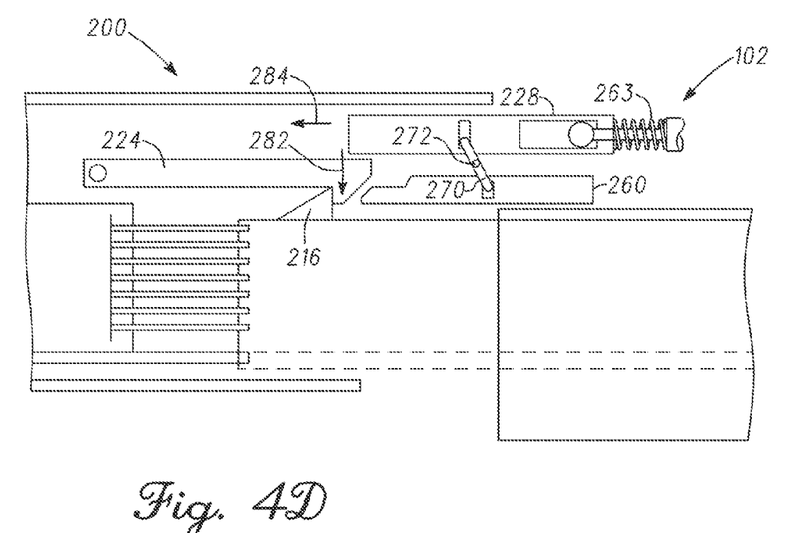

FIGS. 4A-4D illustrate plug-in charging port 102 and charging cable 200 moving into a latched (inter-coupling of 216 and 224) and locked (228 blocking the rise of 224) position. For convenience, description of most of the like reference numerals for like elements of FIG. 3 are omitted. In FIG. 4A, the plug 200 advances toward the receptacle 212 (as illustrated by the arrow 280) causing the cable latch 224 to strike and rise upward over the receptacle latch 216. In FIG. 4B, the cable latch 224 is seen to also contact the lock bolt 228 causing it to be pushed back against the bias 263, which in turn, causes the unlatch bolt to advance due to the connection 270 moving about its axis 272. In FIG. 4C, the cable latch 224 clears the receptacle latch 216 as the locking bolt 228 continues to be pushed back and the unlatch bolt continues to move forward. Finally, in FIG. 4D, the cable latch 224 drops over the receptacle latch 216 (as indicated by arrow 282) and clear of the lock bolt 228. The lock bolt bias 263 now advances the lock bolt forward (as indicated by the arrow 284), which prevents the cable latch from rising over the receptacle latch 216 until a permitted unlock/unlatch operation occurs.

Figure 5A:
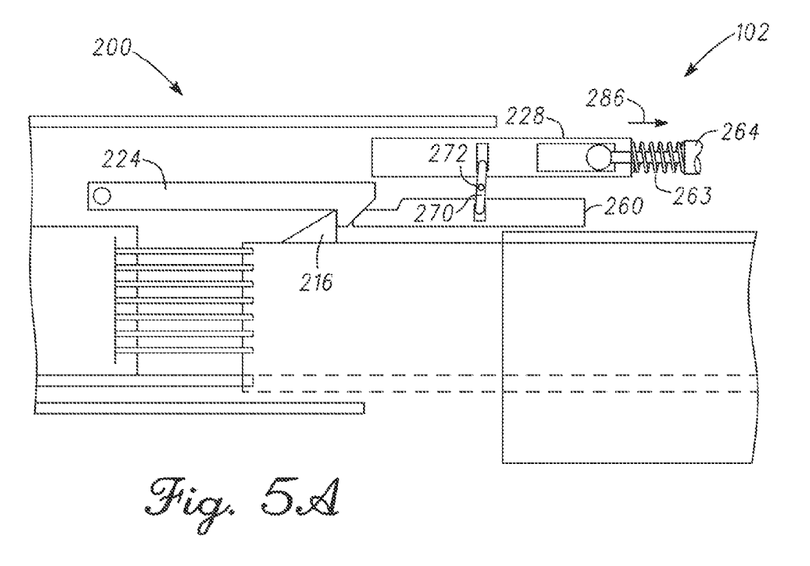
FIGS. 5A-5C are illustrations of the exemplary charging port and charging cable of FIGS. 2A and 2B moving to an unlatched and unlocked position according to an exemplary embodiment.
Figure 5B:
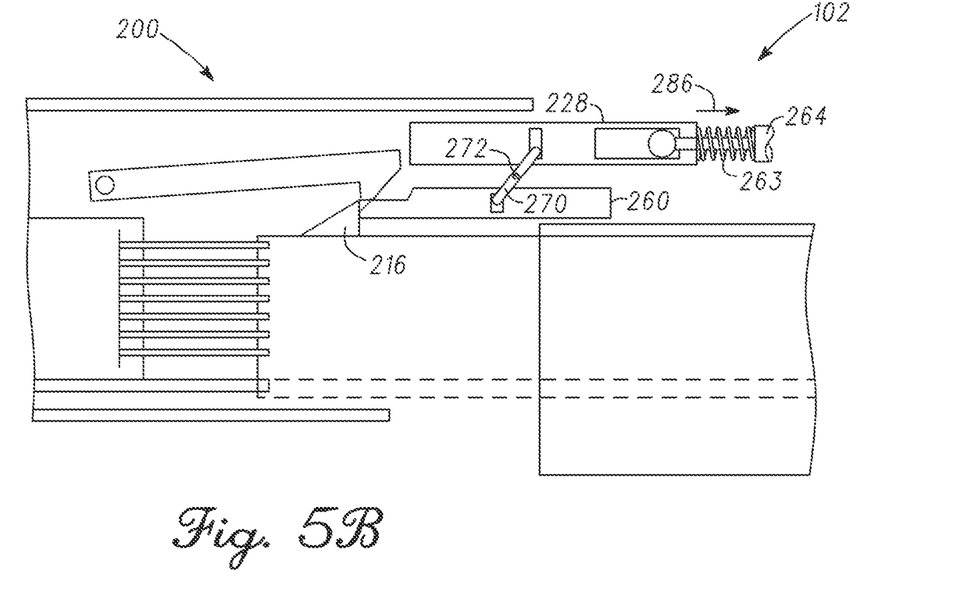
Figure 5C:
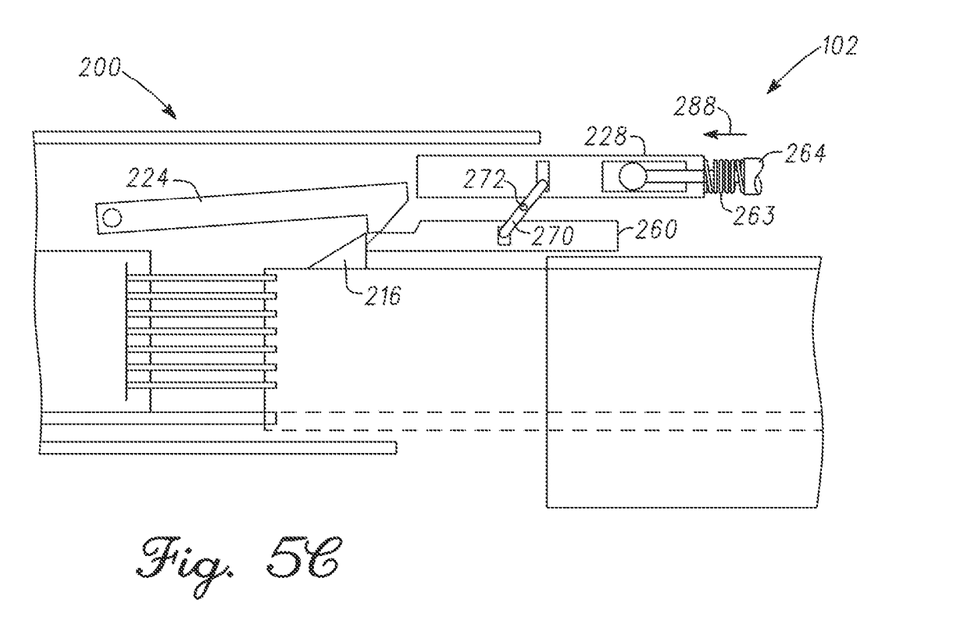

FIGS. 5A-5C illustrate plug-in charging port 102 and charging cable 200 moving into an unlocked and unlatched position. For convenience, description of most of the like reference numerals for like elements of FIG. 3 are omitted. As previously mentioned, ordinarily some actuation mechanism (e.g., solenoid) would retract the locking bolt 228 or advance the unlatch bolt 260 responsive to a user action such as activating a key fob. However, in the unlikely event of a system failure or damage to a component, the present disclosure provides a secondary (or backup) release system that uses cable 264 to unlock and unlatch the plug 200 from the charging port 102. In FIG. 5A, the secondary (backup) unlock/unlatch process begins by the release cable 264 being withdrawn (as indicated by the arrow 286) via a manual backup release system described below in conjunction with FIGS. 6-8. The movement of the release cable 264 causes the lock bolt 228 to be withdrawn and the unlatch bolt 260 to advance due to the connector 270 moving about its axis 272. In FIG. 5B, the unlatch bolt 260 makes contact with the cable latch 224, which begins to rise over the receptacle latch 216 since the lock bolt 228 has been withdrawn to a position that permits that rise. In FIG. 5C, the cable latch 224 has cleared the receptacle latch 216 and the plug 200 is now free to be unplugged from the vehicle 100. Note that the release cable 264 moves forward as indicated by the arrow 288 (due to a return spring mechanism discussed below), however, the lock bolt 228 remains in the retracted position via friction until the next plug in operation of the plug 200 (see FIGS. 4A-4D above).

Figure 6:
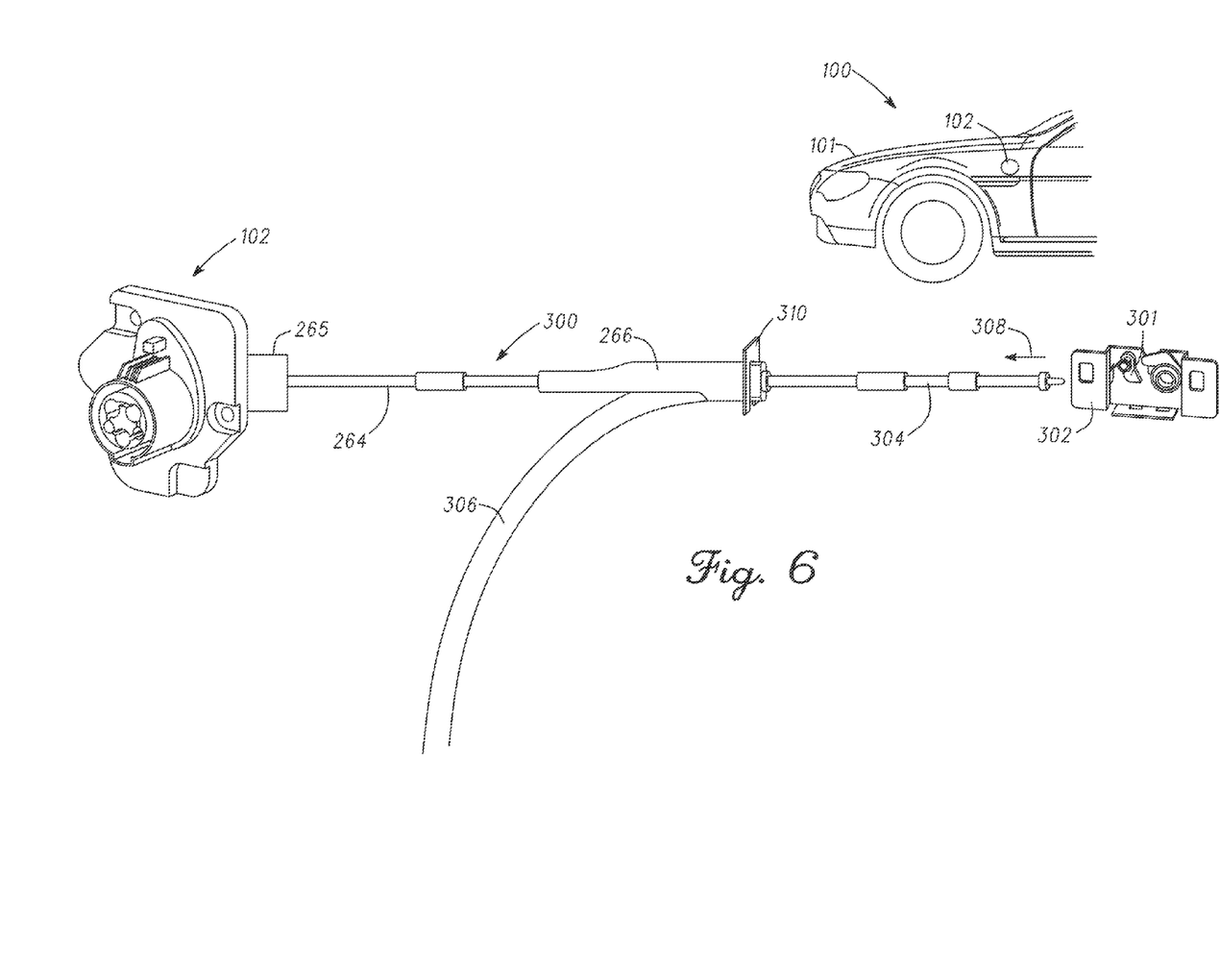
FIGS. 6-8 are illustrations of an exemplary dual-pull release cable arrangement suitable for use with the exemplary embodiments.

Referring now to FIG. 6, an exemplary embodiment of a cable release system 300 is illustrated. While some embodiments may implement an independent cable release system for the charging plug 200 and the receptacle 102, many embodiments of the present disclosure contemplate an integrated or merged implementation with an existing system in the vehicle 100. These integrated embodiments have an advantage of user familiarity and easy of user operation. As shown in FIG. 6, the charging port 102 of the vehicle 100 has the release cable 264 is integrated with the hood release 302 of the vehicle. This is accomplished by the release cable 264 being coupled 266 to the sheath 306 of the hood release cable 304. Operationally, when the user pulls the hood release lever (not shown), the hood release cable 304 moves toward the release lever (as indicated by the arrow 308) and into the sheath 306. However, a retainer 310 prevents the lock bolt release cable 264 from moving by blocking the connector 266 from moving forward. Thus, initially, the plug 200 and charging port 102 secondary release system is inhibited from operation until the hood release has operated to release the hood 101 from the hood latch 302.

Figure 7:
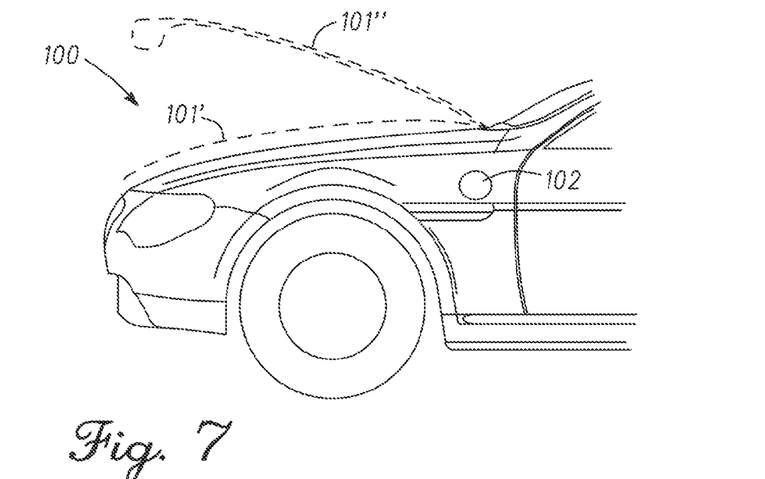

In FIG. 7, the vehicle 100 is shown with the hood 101 raised to a first position 101' and a second position 101''. Typically, the hood 100 is spring loaded and opens to a first (safety) position 101' automatically upon operation of the hood release lever. In some embodiments, the retainer 310 (FIG. 6) is coupled to the hood 101 and releases the connector 266 upon moving the first (safety) position 101'. In other embodiments, the hood 101 must be manually released from the first position 101' to the second position 101'' for the retainer 310 to have moved sufficiently to free the retainer 310 operate as will be described in conjunction with FIG. 8.

Figure 8:
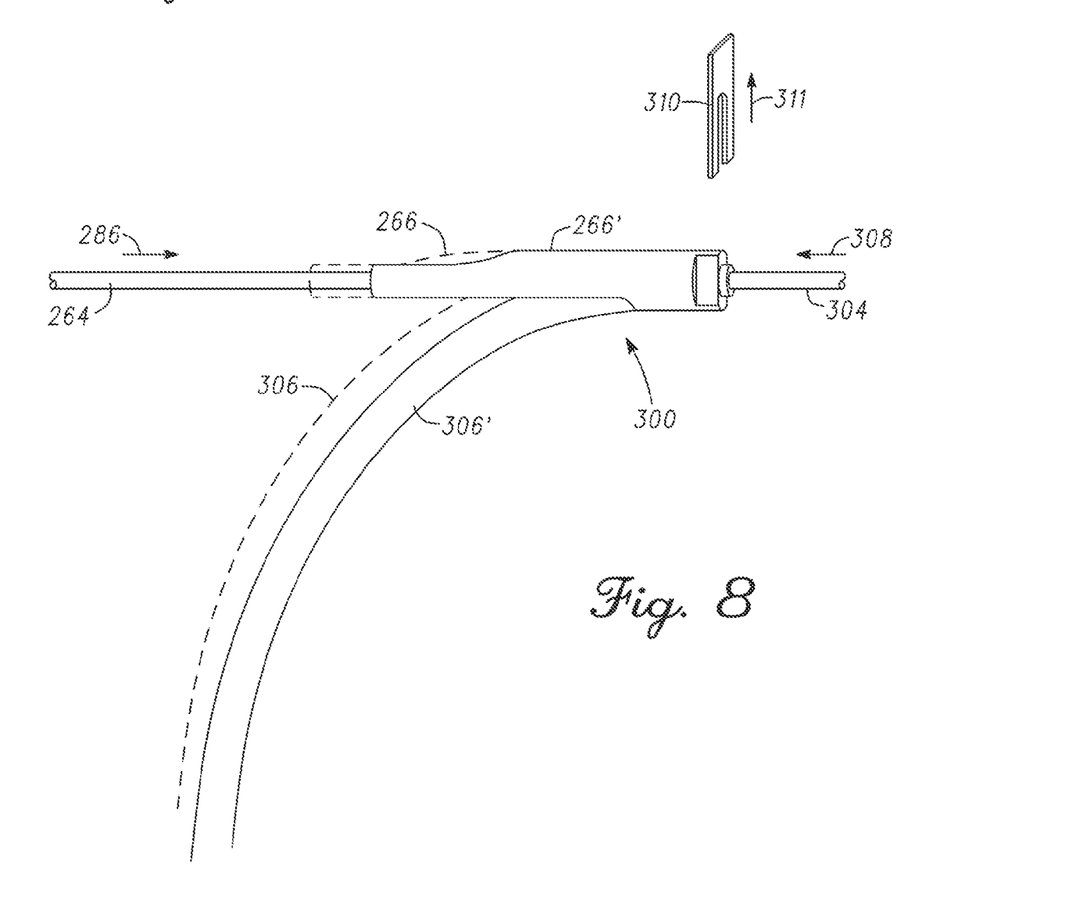

Referring now to FIG. 8, the retainer 310 is illustrated as rising (indicated by the arrow 311), meaning that the hood 101 has moved either to the first position 101' or the second position 101'' depending upon the embodiment implemented. Upon operation of the hood release lever (not shown), the hood release cable 304 moves as discussed above in conjunction with FIG. 7, however, the lock bolt release cable 264 also moves (as indicated by the arrow 286) due to the forward motion (flexing) of the sheath 306 which moves forward as shown as 306'. Consequently, the connector 266 moves forward as shown as 266' moving the lock bolt release cable 264. This provides a "dual pull" secondary (backup) release system 300 integrating the hood release action to the charging plug/receptacle release action in a two-step process. First, the hood is release to position 101' or 101'' (depending upon the embodiment implemented). Next, a second operation of the hood release lever now releases the charging plug 200 from the charging port 102 (since the hood is already released).

As illustrated in FIG. 8, if the return springs (265 and 301 of FIG. 6) are of approximately equal stiffness, movement of the hood release cable 304 and the lock bolt release cable 264 is approximately equal during the second operation of the hood release lever. However, other embodiments are possible if the stiffness factor of the return springs 301 and 265 (FIG. 6) is modified.

Figure 9:
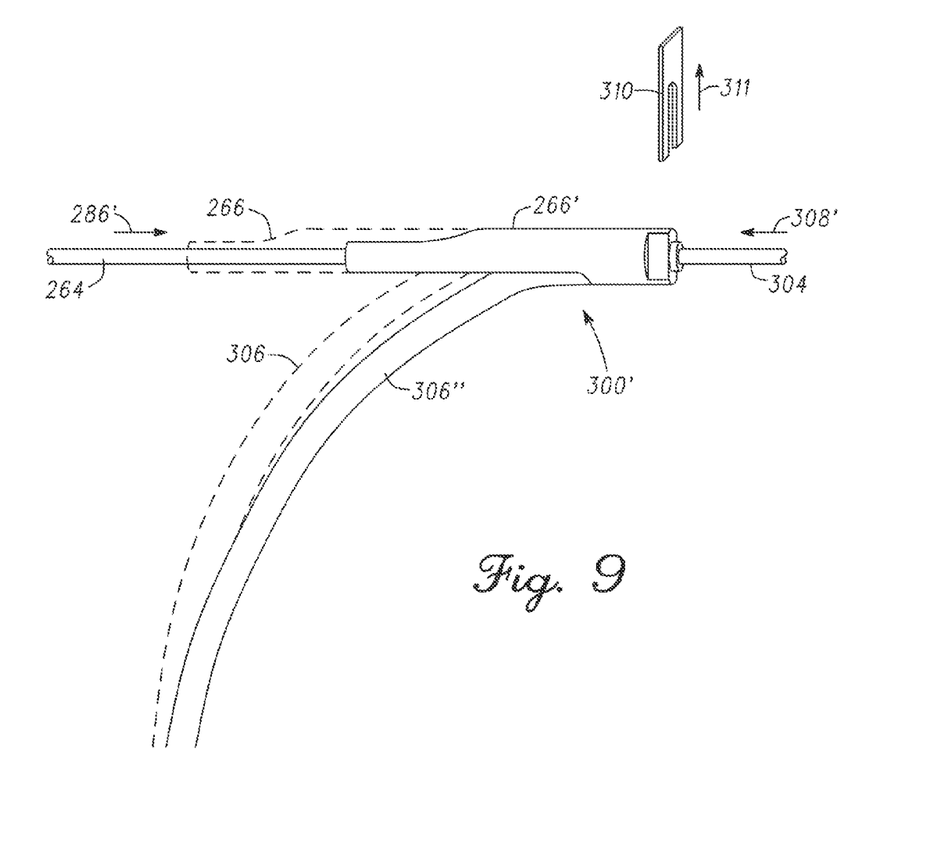
FIG. 9 is an illustration of an alternate embodiment of a dual-pull release cable arrangement suitable for use with the exemplary embodiments.

Referring now to FIG. 9, an alternate exemplary embodiment of a cable release system 300' is illustrated. In this embodiment, the stiffness of the hood release return spring (301 of FIG. 6) is much greater than the lock bolt return spring (265 of FIG. 6). Consequently, when the retainer 310 is raised (311) due to the hood 101 being opened to the first position (101') or the second position (101'') by a first operation of the hood release lever, the second operation of the hood release lever causes a much greater movement in the lock bolt release cable (sheath 306 to 306'' and connector 266 to 266'') as indicated by the magnitude (size) of the arrows 286' and 308'. This would facilitate user operation by requiring a much smaller movement of the hood release lever after opening the hood initially to release the charging plug 200 from the charging port 102.

In any of the multitude of embodiments afforded by the present disclosure, a simple, reliable and easy to use secondary (backup) charging plug 200 and charging receptacle release mechanism is provided for the convenience of the user of the vehicle 100.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
   an electric engine coupled to a battery source;
   a hood assembly having a hood latch;
   a charging port configured to receive a charging cord for charging the battery source and having a lock bolt configured to lock the charging cord in the charging port, wherein the charging cord includes a latch for latching the charging cord to the charging port, and the charging port includes an unlatch bolt coupled to the lock bolt; and a cable release system comprising:
   a first cable coupled to the hood latch;
   a second cable coupled to the lock bolt and a sheath of the first cable; and a retainer coupled to the hood assembly configured to limit movement of the second cable until the hood latch has released the hood assembly and thereafter release the second cable;

wherein a first operation of the cable release system unlocks the charging cord from the charging port and a second operation of the cable release system unlocks the charging cord from the charging port and the unlatch bolt is configured to unlatch the latch of the charging cord from the charging port when the second cable moves the lock bolt to an unlocked position.

2. The vehicle of claim 1, which includes a a guide pin in the charging cable to facilitate alignment with the charging port.

3. The vehicle of claim 2, wherein the hood latch is coupled to a first return spring having a first spring stiffness.

4. The vehicle of claim 3, wherein the lock bolt is coupled to a second return spring having a second spring stiffness being less than the first spring stiffness.

5. The vehicle of claim 1, wherein the hood latch is coupled to a first return spring having a first spring stiffness and the lock bolt is coupled to a second return spring having approximately the first spring stiffness.

6. A vehicle, comprising:
an electric engine coupled to a battery source;
a hood assembly having a hood latch;
a charging port configured to receive a charging cord for charging the battery source, the charging cord having a latch for coupling the charging cord to the charging port, and the charging port having a lock bolt configured to lock the latch of the charging cord in the charging port;
a cable release system, comprising:
a first cable coupled to the hood latch, the first cable including a sheath;
a second cable coupled to the lock bolt and the sheath of the first cable; and
a retainer coupled to the hood assembly configured to limit movement of the second cable until the hood latch has released the hood assembly;
wherein a first operation of the cable release system releases the hood latch and a second operation of the cable release system unlocks the charging cord from the charging port;
an unlatch bolt coupled to the lock bolt and configured to unlatch the latch of the charging cord from the charging port when the second cable moves the lock bolt to an unlocked position.

7. The vehicle of claim 6, wherein the hood assembly moves to a first position after release.

8. The vehicle of claim 7, wherein the retainer releases the second cable after the hood assembly has moved to the first position.

9. The vehicle of claim 8, wherein the movement of the second cable after release from the retainer moves the lock bolt to an unlocked position.

10. The vehicle of claim 7, which includes a guide pin in the charging cable to facilitate alignment with the charging port.

11. A vehicle, comprising:
an electric engine coupled to a battery source;
a hood assembly having a hood latch moveable from a latched position to an unlatched position;
a charging port configured to receive a charging cord for charging the battery source the charging cord having a latch for coupling the charging cord to the charging port, and the charging port having a lock bolt configured to lock the charging cord in the charging port in a locked position and being movable to an unlocked position and an unlatch bolt coupled to the lock bolt and configured to unlatch the latch of the charging cord from the charging port; and
a cable release assembly, comprising:
a first cable coupled to the hood latch, the first cable having a sheath;
a second cable coupled to the lock bolt and the sheath of the first cable; and
a retainer coupled to the hood assembly configured to prevent the second cable from moving the lock bolt from the locked position to the unlocked position until the first cable has moved the hood assembly from the latched position to the unlatched position;
wherein a first operation of the cable release system releases the hood latch and a second operation of the cable release system moves the lock bolt to an unlocked position and unlatches the latch of the charging cord via the unlatch bolt from the charging port.

12. The vehicle of claim 11, wherein upon a first operation of the cable release assembly, the hood assembly moves to a first position after the first cable has moved the hood assembly from the latched position to the unlatched position.

13. The vehicle of claim 12, wherein the retainer releases the second cable after the hood assembly has moved to the first position.

14. The vehicle of claim 13, which includes a guide pin in the charging cable to facilitate alignment with the charging port.

15. The vehicle of claim 12, wherein the retainer releases the second cable after the hood assembly has moved from the first position to a second position.

16. A vehicle, comprising:
an electric engine coupled to a batter source;
a charging port configured to receive a charging cord for charging the battery source and having a lock bolt configured to lock the charging cord in the charging port;
a latch assembly configured to move from a latched position to an unlatched position;
a dual-pull cable release assembly having a first cable coupled to the latch assembly and a second cable coupled to a sheath of the first cable; and
a retainer configured to limit movement of the second cable until the first cable has moved the latch assembly to the unlatched position and then release the second cable after the latch assembly has moved to the unlatched position;
wherein a first operation of the dual-pull cable release assembly moves the latch assembly to the unlatched position and a second operation of the dual-pull cable release assembly unlocks the charging cable from the charging port;
and an unlatch bolt coupled to the lock bolt and configured to unlatch the charging cord from the charging port when the second cable moves the lock bolt to an unlocked position.

* * * * *